US008492952B2

(12) United States Patent
Bradfield

(10) Patent No.: US 8,492,952 B2
(45) Date of Patent: Jul. 23, 2013

(54) COOLANT CHANNELS FOR ELECTRIC MACHINE STATOR

(75) Inventor: Michael D. Bradfield, Anderson, IN (US)

(73) Assignee: Remy Technologies, LLC, Pendleton, IN (US)

(*) Notice: Subject to any disclaimer, the term of this patent is extended or adjusted under 35 U.S.C. 154(b) by 116 days.

(21) Appl. No.: 12/897,677

(22) Filed: Oct. 4, 2010

(65) Prior Publication Data
US 2012/0080965 A1   Apr. 5, 2012

(51) Int. Cl.
*H02K 5/12* (2006.01)

(52) U.S. Cl.
USPC ............. 310/216.011; 310/216.056; 310/57; 310/59; 310/65

(58) Field of Classification Search
USPC ............... 310/57, 59, 65, 216.011, 216.014, 310/216.055, 216.056
See application file for complete search history.

(56) References Cited

U.S. PATENT DOCUMENTS

| 1,882,487 A | * | 10/1932 | Dupont ........................... 310/65 |
| 2,080,678 A | | 5/1937 | Van Horn et al. |
| 2,264,616 A | | 12/1941 | Buckbee |
| 3,009,072 A | * | 11/1961 | Mossay .......................... 310/57 |
| 3,447,002 A | | 5/1969 | Ronnevig |
| 3,525,001 A | | 8/1970 | Erickson |
| 3,748,507 A | | 7/1973 | Sieber |
| 3,783,318 A | * | 1/1974 | Widstrand ............. 310/216.014 |
| 4,038,570 A | | 7/1977 | Durley, III |
| 5,081,382 A | | 1/1992 | Collings et al. |
| 5,180,004 A | | 1/1993 | Nguyen |
| 5,207,121 A | | 5/1993 | Bien |
| 5,293,089 A | | 3/1994 | Frister |
| 5,331,238 A | * | 7/1994 | Johnsen ........................... 310/58 |
| 5,372,213 A | | 12/1994 | Hasebe et al. |
| 5,519,269 A | | 5/1996 | Lindberg |
| 5,616,973 A | | 4/1997 | Khazanov |
| 5,859,482 A | | 1/1999 | Crowell et al. |
| 5,923,108 A | | 7/1999 | Matake et al. |
| 5,937,817 A | | 8/1999 | Schanz et al. |
| 5,965,965 A | | 10/1999 | Umeda et al. |
| 5,982,071 A | * | 11/1999 | Ehrick .................... 310/216.056 |
| 6,011,332 A | | 1/2000 | Umeda et al. |
| 6,069,424 A | | 5/2000 | Colello et al. |

(Continued)

FOREIGN PATENT DOCUMENTS

| JP | 05-103445 A | 4/1993 |
| JP | 05-292704 A | 11/1993 |

(Continued)

OTHER PUBLICATIONS

International Search Report, mailed Jul. 31, 2012.

(Continued)

*Primary Examiner* — Dang Le
(74) *Attorney, Agent, or Firm* — Greenberg Traurig LLP

(57) ABSTRACT

Embodiments of the invention provide an electric machine module including an electric machine with a stator assembly. The stator assembly includes a plurality of stator laminations and the plurality of stator laminations include a plurality of different outer diameters. The plurality of stator laminations are positioned relative to one another to form radially-extending fins. At least one circumferential coolant channel is defined along the circumference of the stator assembly by the plurality of stator laminations at least partially between the radially-extending fins.

1 Claim, 3 Drawing Sheets

U.S. PATENT DOCUMENTS

| | | | |
|---|---|---|---|
| 6,075,304 A | 6/2000 | Nakatsuka |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Masegi |
| 6,559,572 B2 | 5/2003 | Nakamura |
| 6,579,202 B2 | 6/2003 | El-Antably et al. |
| 6,770,999 B2 | 8/2004 | Sakurai |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,026,733 B2 | 4/2006 | Bitsche et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,633,194 B2 * | 12/2009 | Dawsey et al. ............... 310/57 |
| 7,667,359 B2 | 2/2010 | Lee et al. |
| 7,939,975 B2 | 5/2011 | Saga et al. |
| 8,067,865 B2 | 11/2011 | Savant |
| 8,068,327 B2 | 11/2011 | Seifert et al. |
| 2003/0222519 A1 | 12/2003 | Bostwick |
| 2004/0036367 A1 | 2/2004 | Denton et al. |
| 2004/0189110 A1 | 9/2004 | Kazumasa |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0223557 A1 | 9/2008 | Fulton et al. |
| 2009/0121562 A1 | 5/2009 | Yim |
| 2009/0121564 A1 * | 5/2009 | Pal et al. ............... 310/58 |
| 2009/0174278 A1 | 7/2009 | Sheaffer et al. |
| 2009/0206687 A1 | 8/2009 | Woody et al. |
| 2010/0026111 A1 | 2/2010 | Monzel |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2011/0050141 A1 | 3/2011 | Yeh et al. |
| 2011/0101700 A1 | 5/2011 | Stiesdal |
| 2011/0109095 A1 | 5/2011 | Stiesdal |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report completed Apr. 20, 2012.
International Search Report.
International Search Report completed Apr. 19, 2012.
International Search Report completed Apr. 9, 2012.
International Search Report completed Mar. 8, 2012.
International Search Report completed Apr. 24, 2012.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.

* cited by examiner

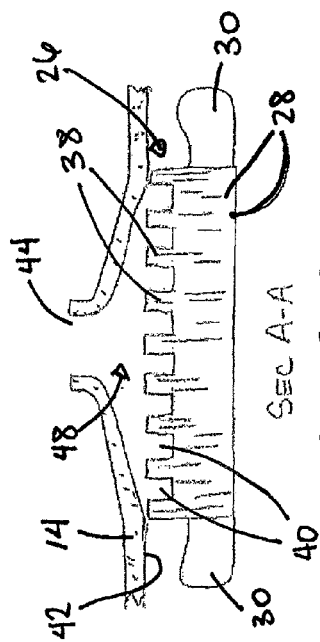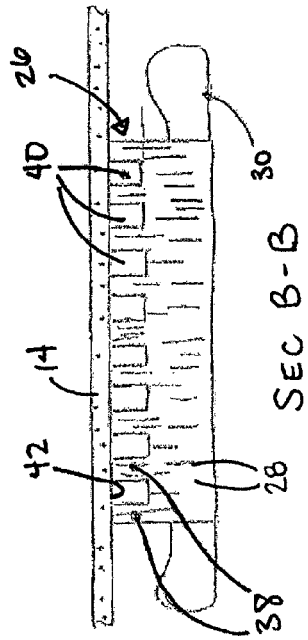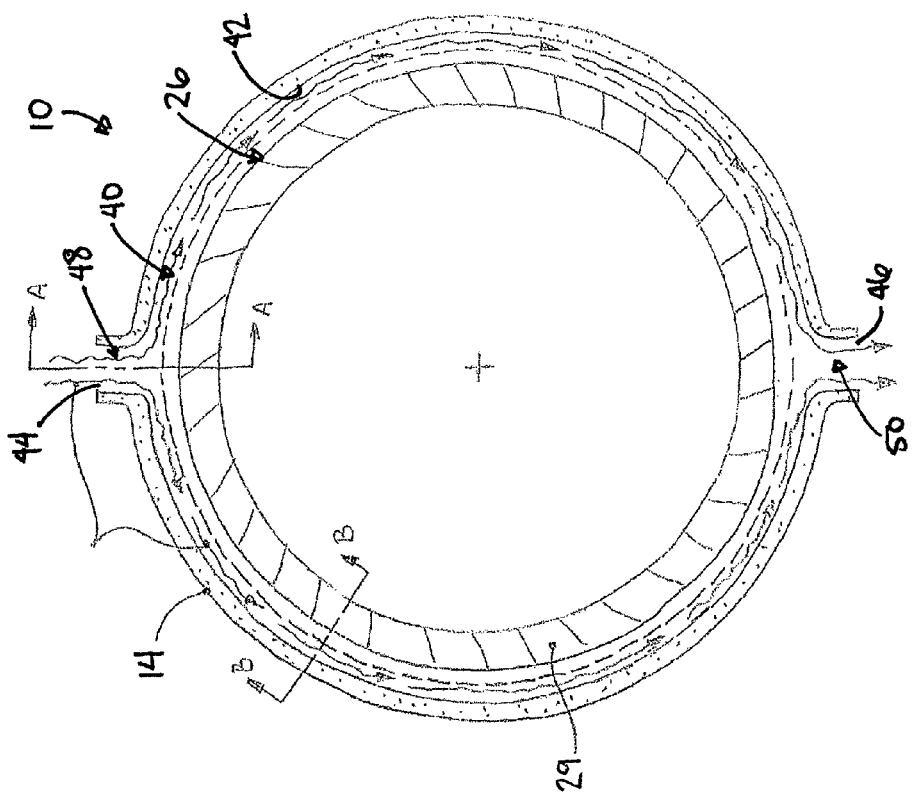

COOLANT CHANNELS FOR ELECTRIC MACHINE STATOR

BACKGROUND

Electric machines, often contained within a housing, are generally comprised of a stator assembly and a rotor. During operation of electric machines, a considerable amount of heat energy can by generated by both the stator assembly and the rotor, as well as other components of the electric machine. Conventional cooling methods include removing the generated heat energy by forced convection to a jacket filled with a coolant. The coolant jacket is often contained within or outside walls of the housing.

SUMMARY

Some embodiments of the invention provide an electric machine module including an electric machine with a stator assembly. The stator assembly includes a plurality of stator laminations and the plurality of stator laminations includes a plurality of different outer diameters. The plurality of stator laminations are positioned relative to one another to form radially-extending fins. The electric machine module also includes at least one circumferential coolant channel defined by the plurality of stator laminations. The at least one circumferential coolant channel is defined substantially along a circumference of the stator assembly at least partially between the radially-extending fins.

Some embodiments of the invention provide a method for cooling an electric machine module. The method may include providing the electric machine including a stator assembly with a plurality of stator laminations. The plurality of stator laminations include a plurality of different outer diameters. The method can also include positioning the plurality of stator laminations relative to one another to create radially-extending fins and at least one circumferential coolant channel at least partially between the radially-extending fins. The at least one circumferential coolant channel is defined substantially along a circumference of the stator assembly. The method can further include providing a housing substantially circumscribing the electric machine, the housing including an inlet port and an outlet port in fluid communication with the at least one circumferential coolant channel, introducing a coolant through the inlet port, and circulating the coolant through the at least one circumferential coolant channel toward the outlet port to cool the electric machine.

Some embodiments of the invention provide an electric machine module including an electric machine with a stator assembly. The stator assembly includes a plurality of stator laminations and the plurality of stator laminations include a plurality of different outer diameters. The electric machine module also includes a housing with a sleeve member and at least one end cap coupled to the sleeve member. The housing substantially encloses the electric machine within a machine cavity. The electric machine module can also include at least one circumferential coolant channel defined by the plurality of stator laminations and the sleeve member. The at least one circumferential coolant channel is defined substantially along a circumference of the stator assembly.

DESCRIPTION OF THE DRAWINGS

FIG. 2A is a side cross-sectional view of an electric machine module according to one embodiment of the invention.

FIG. 2B is a sectional view of the electric machine module of FIG. 2A along line A-A.

FIG. 2C is a sectional view of the electric machine module of FIG. 2A along line B-B.

DETAILED DESCRIPTION

Figure 1:
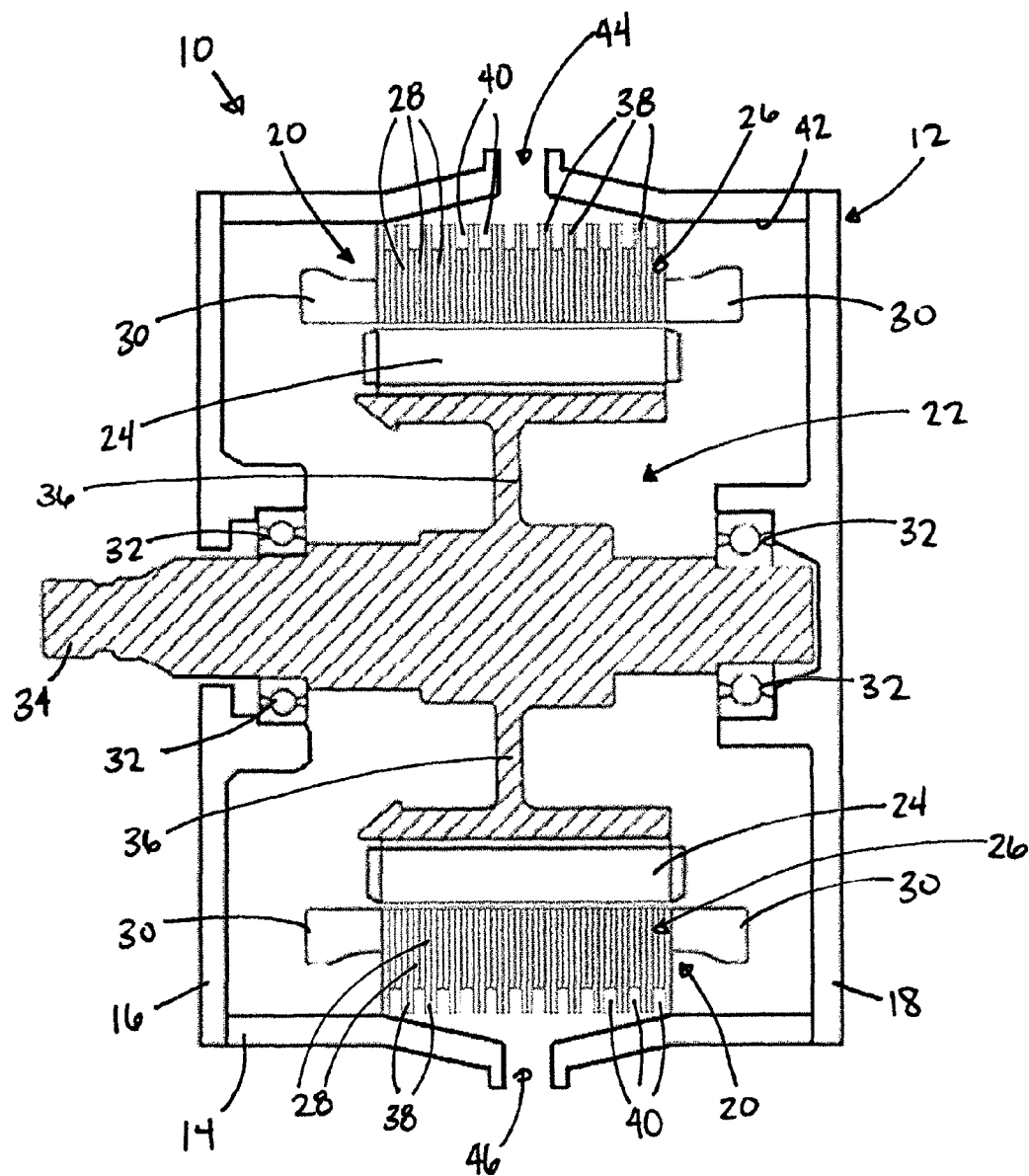
FIG. 1 is a front cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an electric machine module 10 according to one embodiment of the invention. The electric machine module 10 can include a housing 12 comprising a sleeve member 14, a first end cap 16, and a second end cap 18. An electric machine 20 can be housed within a machine cavity 22 at least partially defined by the sleeve member 14 and the end caps 16, 18. The housing 12 can circumscribe the electric machine 20. For example, the sleeve member 14 and the end caps 16, 18 can be coupled via fasteners (not shown), or another suitable coupling manner, to enclose the electric machine 20 within the machine cavity 22. In other embodiments, the housing 12 can comprise a substantially enclosed, substantially cylindrical canister and a single end cap (not shown).

The electric machine 20 can include a rotor 24, a stator assembly 26 comprising a plurality of stator laminations 28, stator windings 29 (as shown in FIG. 2A), and stator end turns 30, and bearings 32, and can be disposed about a main output shaft 34. As shown in FIG. 1, the stator assembly 26 can circumscribe the rotor 24. In some embodiments, the electric machine 20 can also include a rotor hub 36 or can have a "hub-less" design (not shown). The electric machine 20 can be, without limitation, an electric motor, such as a hybrid electric motor, an electric generator, or a vehicle alternator. In one embodiment, the electric machine 20 can be a High Voltage Hairpin (HVH) electric motor for use in a hybrid vehicle.

Components of the electric machine 20 such as, but not limited to, the stator assembly 26 and the rotor 24 can generate heat during operation of the electric machine 20. These components can be cooled to enhance the performance and increase the lifespan of the electric machine 20.

In some embodiments, the plurality of stator laminations 28 can be positioned relative to one another to create a finned outer surface of the stator assembly 26. More specifically, the plurality of stator laminations 28 can have a plurality of different outer diameters, creating radially-extending "fins" 38 around a circumference of the stator assembly 26. For example, as shown in FIGS. 1-2C, a first set of stator laminations 28 can include at least a portion having a first outer diameter, and a second set of stator laminations 28 can include at least a portion having a second outer diameter larger than the first outer diameter, thus forming the finned outer surface. The first set and the second set can be staggered one by one, two by two, one by two, etc. to form a desired fin profile around the circumference of the stator assembly 26. In one embodiment, the second outer diameter can be substantially equal to an inner diameter of the sleeve member 14 so that the second set of stator laminations 28 come in contact with the sleeve member 14. Circumferential coolant channels 40 can be defined between an outer surface of the first set of stator laminations 28 and side surfaces of the second set of stator laminations 28 (i.e., between the fins 38). In some embodiments, the circumferential coolant channels 40 can be further defined by at least a portion of an inner surface 42 of the sleeve member 14. A coolant, such as water, ethylene glycol, a water/ethylene glycol mixture, oil, transmission fluid, or any similar substance, can be circulated through the circumferential coolant channels 40 (i.e., between the fins 38 in a circumferential direction) to help cool the stator assembly 26, as shown in FIG. 2A.

In some embodiments, the sleeve member 14 can include one or more inlet ports 44 and one or more outlet ports 46 both in fluid communication with the circumferential coolant channels 40. The coolant can be supplied to the circumferential coolant channels 40 through the inlet port 44 and can be exhausted from the circumferential coolant channels 40 through the outlet port 46. In one embodiment, the inlet port 44 and the outlet port 46 can be positioned at opposite sides of the sleeve member 14 (i.e., about 180 degrees apart), as shown in FIG. 2A. In another embodiment, the inlet port 44 and the outlet port 46 can be positioned at another angular distance apart (e.g., 170 degrees, 160 degrees, etc.) from each other along the sleeve member 14 which still allows two separate fluid paths for coolant to travel through the circumferential coolant channels 40 from the inlet port 44 to the outlet port 46. More specifically, the inlet port 44 and the outlet port 46 can be positioned an angular distance away from each other so that the coolant entering the inlet port 44 can be split into two separate fluid paths which can reach the outlet port 46.

In one embodiment, the sleeve member 14 can include a varying inner radius along its axial length near the inlet port 44 and the outlet port 46. As shown in FIG. 2B, the sleeve member 14 can taper radially outward from an axially outermost fin 38 toward an axial edge of the inlet port 44, and back radially inward from an opposite axial edge of the inlet port 44 to an opposite axially outermost fin 38. The sleeve member 14 can taper from a larger radius near axial edges of the inlet port 44 to a smaller radius substantially equal to an outer radius of the axially outermost fins 38, forming a supply cavity 48 between the sleeve member 14 and the fins 38 (i.e., adjacent to both the sleeve member 14 and the fins 38). As a result, the inlet port 44 can be in fluid communication with each of the circumferential coolant channels 40 via the supply cavity 48. An axial width of the supply cavity 48 can be substantially as wide as an axial width of the inlet port 44 (as shown in FIG. 2A), can be smaller than the axial width of the inlet port 44, respectively, or can vary along a radial height of the supply cavity.

In addition, the sleeve member 14 can taper radially outward from an axially outermost fin 38 toward an axial edge the outlet port 46, and back radially inward from an opposite axial edge of the outlet port to an opposite axially outermost fin 38. The sleeve member 14 can taper from a larger radius at axial edges of the outlet port 46 to a smaller radius substantially equal to the outer radius of the axially outermost fins 38, forming an exhaust cavity 50 between the sleeve member 14 and the fins 38 (i.e., adjacent to both the sleeve member 14 and the fins 38). As a result, the outlet port 46 can be in fluid communication with each of the circumferential coolant channels 40 via the exhaust cavity 50. An axial width of the exhaust cavity 50 can be substantially as wide as an axial width of the outlet port 46 (as shown in FIG. 2A), can be smaller than the axial width of the outlet port 46, respectively, or can vary along a radial height of the exhaust cavity 50. Also, in some embodiments, the sleeve member 14 can have a substantially constant inner radius along its axial length at locations away from the inlet port 44 and the outlet port 46, as shown in FIG. 2C. For example, the sleeve member 14 can include a first portion at locations away from the inlet port 44 and the outlet port 46 which includes a first inner diameter, and a second portion at locations adjacent to the inlet port 44 and the outlet port 46 which includes a second inner diameter. As discussed above, the second inner diameter can change across the axial length of the sleeve member 14.

In another embodiment, the sleeve member 14 can have a substantially constant inner radius along its axial length both near the inlet port 44 and the outlet port 46 as well as locations away from the inlet port 44 and the outlet port 46. Adjacent to the inlet port 44 and the outlet port 46, the outermost fins 38 can have an outer diameter substantially equal to the inner diameter of the sleeve member 14, while inner fins 38 can have a outer diameter smaller than the inner diameter of the sleeve member 14. As a result, the supply cavity 48 and the exhaust cavity 50 can be defined between the inner fins 38 and the sleeve member 14, allowing the inlet port 44 and the outlet port 46 to be in communication with each of the circumferential coolant channels 40. In some embodiments, the inner fins 38 can have the smaller outer diameter along an entire circumference of the stator assembly 26, or only adjacent to the inlet port 44 and the outlet port 46. In addition, in some embodiments, at least the axially outermost fins 38 in contact with the inner surface 42 of the sleeve member 14 (e.g., by a friction fit) can substantially prevent fluid communication between the machine cavity 22 and the plurality of circumferential coolant channels 40.

During operation of the electric machine 20, heat energy generated by the electric machine components can be transferred via forced convection through the stator laminations 28 to the coolant flowing through the circumferential coolant channels 40. As the heat energy is transferred from the electric machine components to the coolant, the electric machine 20 is cooled and the coolant is heated. The heated coolant can be directed out of the circumferential coolant channels 40 through the outlet port 46 to a heat transfer element outside or inside the housing 12, for example, at a fluid source (not shown), for recooling. The heat transfer element can be a radiator or another suitable heat exchanger. Once the coolant is recooled, it can be recycled back to the circumferential coolant channels 40 via the inlet port 44.

Figure 3A:
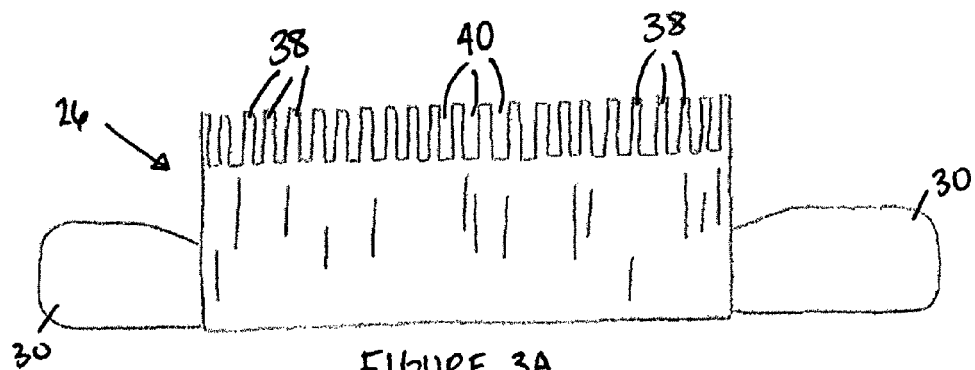
FIGS. 3A-3D are partial front cross-sectional views of a stator assembly of an electric machine with different fin profiles.
Figure 3B:
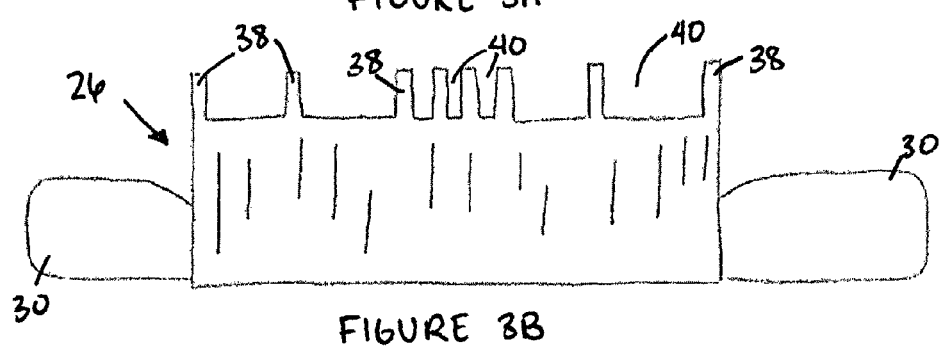
Figure 3C:
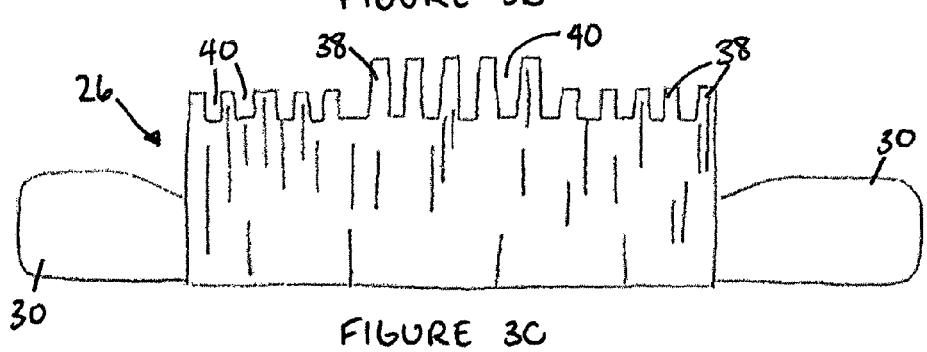
Figure 3D:
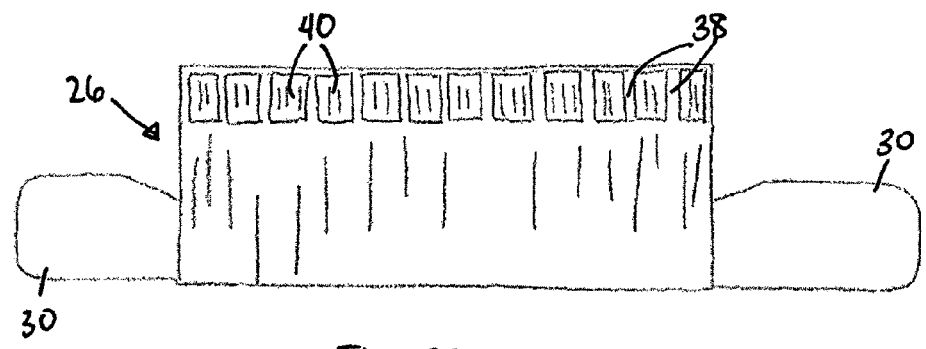

FIGS. 3A-3D are example cross-sections of the stator assembly 26 with fin profiles according to some embodiments of the invention. FIGS. 3A and 3B illustrate different fin profiles including a first set of stator laminations 28 and a second set of stator laminations 28 with a larger outer diameter than the first set. In other embodiments, stator laminations 28 of the second set can be grouped substantially at the two axially outermost positions of the stator assembly 26 such that one circumferential coolant channel 40 can be defined (not shown). FIG. 3C illustrates a fin profile with three sets of stator laminations 28, including the first set and the second set as well as a third set including at least a portion having a larger outer diameter than both the first set and the second set. As a result, the fins 38 can be formed between outer surfaces of the first set and side surfaces of both the second set and the third set. In addition, in some embodiments, the fins 38 can be formed between outer surfaces of the first set, outer surface and side surfaces of the second set, and side surfaces of the third set. FIG. 3D illustrates a fin profile enclosed by an outer diameter of the stator laminations 28. Different fin profiles can be selected based on a desired cooling effect for the electric machine 20.

Conventionally, a stator assembly is inserted into a steel sleeve. An outer surface of the steel sleeve forms an inner surface of a coolant jacket, and another housing member surrounds the steel sleeve to form an outer surface of the coolant jacket. In some embodiments, the circumferential coolant channels 40 can eliminate the need for the coolant jacket. Due to the circumferential coolant channels 40 being an integral part of the stator assembly 26, heat energy can be transferred to the circulating coolant at a quicker rate compared to conventional electric machine modules with outside coolant jackets. More specifically, by allowing the liquid coolant to pass directly across the stator laminations 28, the thermal benefit is maximized since there is no additional thermal drop in conducting heat from the laminations 28 to a second or third body or frame (e.g., the steel sleeve or another housing member), which would be accompanied by thermal resistance. In addition, staggering the outer diameters of the stator laminations 28 can yield a higher surface area for the coolant to come in contact with, compared to a stator assembly with a smooth outer diameter. In some embodiments, each stator lamination 28 can have a thickness of about 0.35 millimeters.

The circumferential coolant channels 40 can be more easily formed and implemented, and thus, cheaper compared to coolant jackets formed by outer housings because fewer materials and manufacturing processes are required for the housing 12. Additionally, in some embodiments, due to the housing 12 not requiring an outer coolant jacket, the total weight of the electric machine module 10 can be reduced compared to electric machine modules with bulkier outer housings containing coolant jackets. Also, the elimination of an outer coolant jacket can substantially reduce an outer diameter of the electric machine module 10. Typically, the steel sleeve/other housing member can added about 8 millimeters to about 10 millimeters to the outer diameter of an electric machine module.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

The invention claimed is:

1. An electric machine module comprising:
an electric machine including a stator assembly, the stator assembly including a plurality of stator laminations, a first set of the plurality of stator laminations having a first substantially constant outer diameter, and a second set of the plurality of stator laminations having a second substantially constant outer diameters larger than the first outer diameter to form a plurality of radially-extending stator assembly fins within the stator assembly and extending to an outer surface of the stator assembly; and
at least one substantially circumferential coolant channel defined substantially along a circumference of the stator assembly; wherein the at least one coolant channel is formed from at least one of the first set of stator laminations; and positioned adjacent to at least two of the second set of stator laminations, wherein the plurality of stator laminations includes a third outer diameter, a third set of stator laminations comprising a third substantially constant outer diameter, the plurality of radially extending stator assembly fins formed between outer surfaces of the first set of stator laminations, at least one of outer surfaces and side surfaces of the second set of stator laminations, and side surfaces of the third set of stator laminations.

* * * * *